Aug. 21, 1923.

D. S. LUDLAM 1,465,647

PISTON

Filed June 21, 1922

Inventor

Dorr S. Ludlam

By Watson E. Coleman
Attorney

Patented Aug. 21, 1923.

1,465,647

UNITED STATES PATENT OFFICE.

DORR S. LUDLAM, OF ONEONTA, NEW YORK.

PISTON.

Application filed June 21, 1922. Serial No. 569,853.

*To all whom it may concern:*

Be it known that I, DORR S. LUDLAM, a citizen of the United States, residing at Oneonta, in the county of Otsego and State of New York, have invented certain new and useful Improvements in Pistons, of which the following is a specification, reference being had to the accompanying drawings.

This invention relates to improvements in pistons, and an important object of the invention is to provide a piston with an oil groove for returning oil from the cylinder walls to the base of the engine which is so located that it provides for proper lubrication of the cylinder wall and at the same time prevents the passage of an excessive amount of oil into the combustion chamber where it will be burned and converted into carbon, resulting in a smoky engine and one of which the plugs quickly soot up.

I am aware that oil grooves have been provided upon engines for the purpose of relieving the excess oil passage but these grooves which come within my knowledge have been located at the lower end of the piston, generally being located immediately below what is commonly known as the oil ring of the piston and which in many types of pistons consists in a ring disposed at the lower extremity of the skirt. A groove of this sort drains the oil back into the crank base without permitting oil to come into contact with the cylinder walls of the upper end of the cylinder and accordingly these walls are dry and the upper rings of the piston exercise a scraping effect thereon which ultimately results in damage not only to the cylinder walls but to the piston. A primary object of the invention is the elimination of this feature of a partially dry wall.

A further object of the invention is to provide an oil groove which may be employed with the present construction of pistons and which accordingly may not only be embodied in a new piston but may be embodied in an old piston without the necessity of purchasing an entirely new set.

These and other objects I accomplish by the construction and arrangement shown in the accompanying drawings wherein for the purpose of illustration is shown a preferred embodiment of my invention and wherein like reference characters designate like parts throughout.

In the drawings:—

Figure 1:
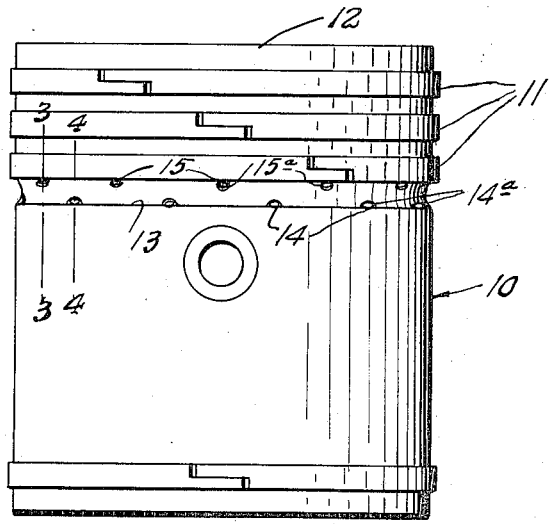
Figure 1 is a side elevation of a piston constructed in accordance with my invention.
Figure 3:
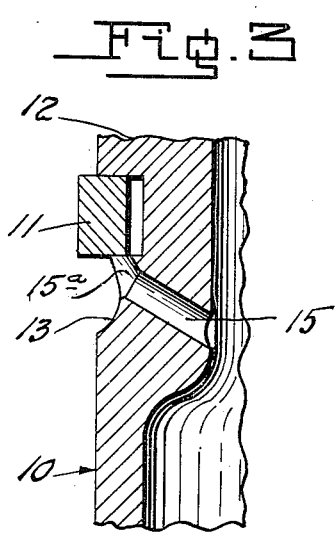
Figure 2:
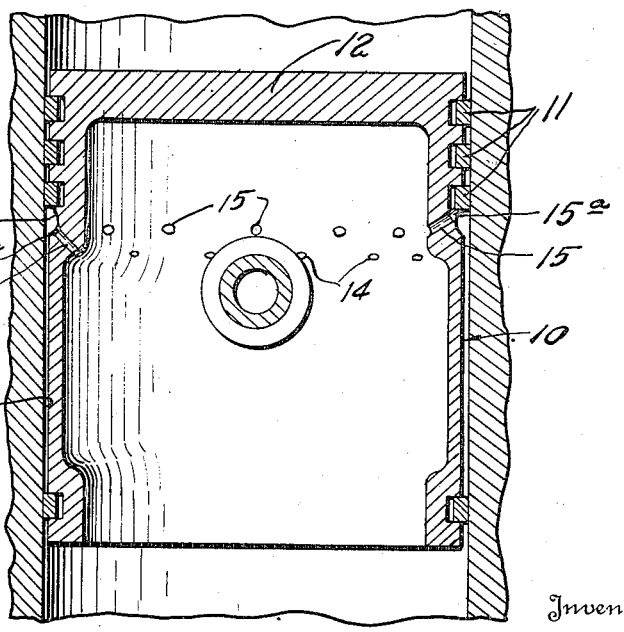
Figure 2 is a sectional view showing the piston in position within the cylinder.
Figure 4:
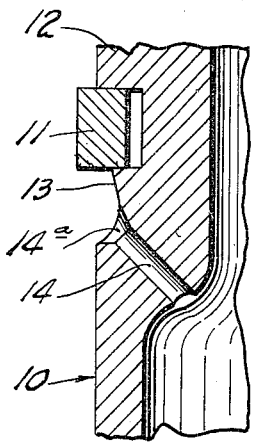

Figures 3 and 4 are enlarged detail sectional views taken on the lines 3—3 and 4—4 of Figure 1 respectively.

Referring now more particularly to the drawings, the numeral 10 designates a piston and 11 the upper or sealing rings of the piston. These rings are usually three in number and are located in what is generally known as the head 12 of the piston where the wall is thickened for their reception. This thickened wall provides an ideal location for an oil groove 13 which is preferably arranged immediately below the lowermost sealing ring 11 and in the average size piston is about $\frac{1}{16}$ of an inch deep and $\frac{3}{16}$ of an inch in height, the upper edge of the groove or cut made to form the groove coinciding with the lower edge of the ring groove. The upper edge of the groove is accordingly formed by the rings 11.

The numeral 14 indicates a plurality of openings connecting the lower end of the groove 13 with the interior of the piston, these openings inclining downwardly toward the center of the piston. The numeral 15 indicates a plurality of similarly inclined openings which open through the upper end of the groove. In fact it is preferred that these openings open partially into the ring groove so that oil collecting beneath the ring and moving inwardly upon the surface thereof will pass directly into these openings. The openings 15 are in staggered relation to the openings 14 and are preferably of larger size than the openings 14 so that they permit the passage of a major portion of the oil from beneath the ring to the interior of the piston during the down stroke but do not permit all of this oil to pass. The result is a wave or wall of oil beneath the lowermost ring 11 which places upon the wall of the cylinder 13 a thin film of oil for lubricating the upper rings 11. The upper ends of the openings 14 and 15 are preferably enlarged by countersinking, as indicated at 14ª and 15ª.

The additional lubrication afforded by this construction may be well appreciated when it is pointed out that in many types of pistons there is a distance of approximately four inches between the upper surface of the uppermost ring of the piston and the lower face of the lower or oil ring of the piston whereas between the upper face of the uppermost sealing ring and the lower face of the lowermost sealing ring there is a distance of only an inch at the most. The oil is therefore under the construction such as set forth, permitted to travel a distance of three inches further up on the cylinder wall than in the old type construction where the oil groove is placed below the oil ring. In other words, the upper ring has only one inch to travel before its entire face is presented to a lubricated surface whereas with the old type a travel of four inches was necessary. It has furthermore been found that the use of the dual system of openings, either of which is insufficient to carry away all of the excess oil and which together are sufficient to carry away this excess oil, arranged as above described provides the most efficient type of lubrication for the cylinder wall, forming a wave or oil film between the piston and cylinder wall equal to the depth of the oil groove.

From the foregoing it is believed to be obvious that a piston constructed in accordance with my invention is particularly well adapted for the purpose for which it is intended for the reason that means are provided for fully lubricating the cylinder wall and at the same time for removing excess oil which would tend to carbonize the motor. It will furthermore be obvious that the same is applicable not only to the construction of new pistons but to the alteration of pistons now in use. I do not wish to be understood as limiting myself to the particular arrangement of oil eduction openings hereinbefore described, as it is possible that with some types of engines and pistons it is necessary to provide a slightly different arrangement of oil openings.

I claim:—

1. A piston for internal combustion engines provided at its upper end with the usual compression ring receiving grooves and having immediately below the lowermost of said grooves an oil groove, said piston being provided with a series of openings inclining downwardly toward the center of the piston and opening through the wall of the groove at the lower end thereof and another series of said openings opening through the wall of the groove at the upper end thereof, the uppermost series of openings being larger than the lower series of openings and being of insufficient size to carry off all of the oil collected by the compression ring adjacent the groove.

2. A piston for internal combustion engines provided at its upper end with the usual compression ring receiving grooves and having immediately below the lowermost of said grooves an oil groove, the upper end of said groove coinciding with the lowermost wall of said ring receiving groove, said piston being provided with a series of openings inclining downwardly toward the center of the piston and opening through the wall of the groove at the lower end thereof and another series of openings opening through the wall of the groove at the upper end thereof and the lower wall of the ring receiving groove.

In testimony whereof I hereunto affix my signature.

DORR S. LUDLAM.